US007218616B2

(12) United States Patent
Karim

(10) Patent No.: US 7,218,616 B2
(45) Date of Patent: May 15, 2007

(54) OCTAGONAL INTERCONNECTION NETWORK FOR LINKING PROCESSING NODES ON AN SOC DEVICE AND METHOD OF OPERATING SAME

(75) Inventor: Faraydon O. Karim, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 866 days.

(21) Appl. No.: 10/090,899

(22) Filed: Mar. 5, 2002

(65) Prior Publication Data

US 2002/0176402 A1 Nov. 28, 2002

Related U.S. Application Data

(60) Provisional application No. 60/274,422, filed on Mar. 9, 2001, provisional application No. 60/309,739, filed on Aug. 2, 2001.

(51) Int. Cl.
*H04L 12/56* (2006.01)
(52) U.S. Cl. ....................................... 370/258
(58) Field of Classification Search ................ 370/254, 370/257, 258; 709/251
See application file for complete search history.

(56) References Cited

U.S. PATENT DOCUMENTS 5,390,164 A * 2/1995 Kremer ..................... 370/223
5,940,367 A * 8/1999 Antonov .................... 370/218
6,111,859 A * 8/2000 Godfrey et al. ............. 370/257
6,848,006 B1 * 1/2005 Hermann ................... 709/239
6,865,149 B1 * 3/2005 Kalman et al. ............. 370/225

OTHER PUBLICATIONS

Ajmone, Marsan M. et al.: "Daisy: a scalable all-optical packet network with multifiber ring topology", Computer Networks and ISDN Systems, North Holland Publishing, Amsterdam, NL, vol. 30, No. 11, Jun. 22, 1998, pp. 1065-1082, XP004131750, ISSN: 0169-7552.
Ross, F.E.: "FDDI-A Tutorial", IEEE Communications Magazine, IEEE Service Center, Piscataway, N.J., US, vol. 24, No. 5, May 1, 1986, pp. 10-17, XP000570100, ISSN: 0163-6804.

* cited by examiner

*Primary Examiner*—Derrick W. Ferris
(74) *Attorney, Agent, or Firm*—Lisa K. Jorgenson; William A. Munck

(57) ABSTRACT

An octagonal interconnection network for routing data packets. The interconnection network comprises: 1) eight switching circuits for transferring data packets with each other; 2) eight sequential data links bidirectionally coupling the eight switching circuits in sequence to thereby form an octagonal ring configuration; and 3) four crossing data links, wherein a first crossing data link bidirectionally couples a first switching circuit to a fifth switching circuit, a second crossing data link bidirectionally couples a second switching circuit to a sixth switching circuit, a third crossing data link bidirectionally couples a third switching circuit to a seventh switching circuit, and a fourth crossing data link bidirectionally couples a fourth switching circuit to an eighth switching circuit.

15 Claims, 4 Drawing Sheets

OCTAGONAL INTERCONNECTION NETWORK FOR LINKING PROCESSING NODES ON AN SOC DEVICE AND METHOD OF OPERATING SAME

The present invention claims priority to 1) U.S. Provisional Patent Application Ser. No. 60/274,422, filed Mar. 9, 2001; and 2) U.S. Provisional Patent Application Ser. No. 60/309,739, filed Aug. 2, 2001.

CROSS-REFERENCE TO RELATED APPLICATIONS

The present invention is related to those disclosed in:
1) U.S. Provisional Patent Application Ser. No. 60/274,422, filed Mar. 9, 2001, entitled "NETWORK OF PROCESSING NODES ON A CHIP AND METHOD OF OPERATING THE SAME"; and
2) U.S. Provisional Patent Application Ser. No. 60/309,739, filed Aug. 2, 2001, entitled "ON-CHIP COMMUNICATION ARCHITECTURE FOR OC-768 NETWORK PROCESSORS".

Provisional Patent Application Ser. Nos. 60/274,422 and 60/309,739 are commonly assigned to the assignee of the present invention. The disclosures of the related provisional applications are hereby incorporated by reference for all purposes.

TECHNICAL FIELD OF THE INVENTION

The present invention is generally directed to system-on-a-chip (SOC) devices and similar large-scale integrated circuits (ICs) and, in particular, to an octagonal interconnection network for use in a SOC device or other integrated circuit (IC).

BACKGROUND OF THE INVENTION

The power, speed and complexity of integrated circuits has improved rapidly in recent years, particularly for such integrated circuits (ICs) as random access memory (RAM) chips, application specific integrated circuit (ASIC) chips, microprocessor (uP) chips, and the like. These improvements have made possible the development of system-on-a-chip (SOC) devices. A SOC device incorporates in a single IC chip many of the components of a complex electronic system, such as a wireless receiver (i.e., cell phone, a television receiver, or the like). The primary advantages of SOC devices are lower costs, greatly decreased size, and reduced power consumption of the system.

One particularly important application of an SOC device is the network processing unit (NPU). With the recent and on-going explosion of low-cost high bandwidth technology, intensive processing tasks and service hosting are moving closer to consumers on the "intelligent edge" of the network, where a significant portion of the future storage, processing and network management will take place. This is particularly true of ultra-high bandwidth fibre communications, which are radically shifting preconceptions about where computation and storage should take place.

In the labs of leading telecom companies, a throughput of 6.4 Terabits/s(6400 Gbit/sec) has been demonstrated using a single fibre strand by means of Wave Division Multiplexing (WDM). The total voice traffic worldwide in 1999 was 10 Terabits/second and the worldwide transoceanic cable capability has grown 1000% between 1999 and 2001. In other words, communication bandwidth and the price of that bandwidth will become much less significant in the near future. This will have a dramatic effect on the complexity and protocols of communication networks. There will be a trend towards much greater simplification and efficiencies through the widespread use of WDM and IP. The last mile to the user will remain a challenge, but this is being addressed progressively by xDSL, cable modems, broadband wireless and satellite links.

Network processing units are proposed to meet the explosive growth in network bandwidth and services. A network processing unit is a highly integrated set of micro-coded or hardwired accelerated engines, memory sub-system, and high speed interconnect and media interfaces to tackle packet processing close to the wire. It uses pipelining, parallelism, and multi-threading to hide latency. It has good data flow management and high-speed internal communications support. It has the ability to access co-processors and is closely coupled with the media interface.

Network processing units present a whole new set of requirements. OC-12 and OC-48 network speeds are becoming common. OC-192 networks, which allow for only 52 ns of processing per packet received, are on the horizon. After that, OC-768 will soon follow, leaving only 13 ns of processing time per packet.

However, it is becoming apparent that traditional SOC devices and processors cannot keep up with the speed and programmability requirements of evolving networks. The Intel IXP 1200 is targeted at LAN-WAN switches operating at OC-48 speeds. The architecture consists of six micro-engines sharing a bus with memory. The micro-engines are managed by a StrongARM core processor. It has a PCI bus to communicate with the host CPU, memory controllers, and a bus interface to network MAC devices. The device operates at 162 MHz. Each micro-engine supports four threads, which helps to eliminate micro-engines waiting for memory resources. Micro-engines have a large register set, consisting of 128 general-purpose registers, along with 128 transfer registers. Shift and ALU operations occur in a single cycle. A hardware hash unit is responsible for the generation of 48 or 64-bit adaptive polynomial hash keys. Multiple IXP 1200 units can be aggregated in serial or parallel.

MMC has developed the AnyFlow 5000 network processor. These have five different stages: ingress processing, switching, queuing, scheduling, and egress processing. Per-flow queuing is used which allows each flow to be queued independently. Other functions handled on a per-flow basis are queuing control and scheduling. MMC also has developed the nP3400, which integrates a programmable packet processor, switch fabric, and multiple Ethernet interfaces on a single chip. It contains two programmable 200-MHz RISC processors and a 4.4 Gb/s switch fabric. It has policy engines supporting 128 rules.

IBM has developed the Rainer NPU. It has sixteen programmable protocol processors and a PowerPC control processor. It has hardware accelerators to perform tree searches, frame forwarding, filtering and alteration. Each processor has a 3-stage pipeline (fetch, decode, execute) and runs at 122 MHz. Each processor has seven coprocessors associated with it, including one for checksum, string copy, and flow information. Hardware accelerators perform frame filtering and alteration and tree searches.

Instruction-set definition, pipelining, parallelism, multi-threading, fast interconnect, and semiconductor technology all combine to produce a network processor capable of OC-192 speeds and higher. Speed-up is possible through an enhanced instruction-set which is designed specifically for network-oriented applications. There are specific instructions for field extraction, byte alignment, comparisons, boolean computations, endianess, conditional opcodes used to reduce branches, and more powerful network-specific computational instructions.

The way in which all the packet-processing engines in a network processing unit connect to internal and external resources is crucial. If a data packet processing engine is unable to continue work because it is limited by a slow interconnection network in the network processing unit (NPU), then much of the processing power is wasted. A primary source of delay in the interconnection network in a network processing unit (NPU) and many other system-on-a-chip (SOC) devices is the number of data links that a data packet must traverse to get from a source node to a destination node within the NPU or other SOC device. Unfortunately, eliminating all multiple hop data links by connecting all processing nodes directly to all other processing nodes, such as by means of an N×N crossbar, results in a complex interconnection network that reduces the speed of data transfers due to the physical length of the interconnections and interference between the interconnections.

Therefore, there is a need in the art for an improved interconnection architecture for system-on-a-chip (SOC) devices and other large scale integrated circuits. In particular, there is a need for an interconnection architecture that minimizes the delay in transferring data between processing nodes in an SOC device, such as a network processing unit. More particularly, there is a need for an interconnection architecture that minimizes the number of hops (or data transfers) between processing nodes in an SOC device, such as a network processing unit.

SUMMARY OF THE INVENTION

To address the above-discussed deficiencies of the prior art, it is a primary object of the present invention to provide an improved interconnection network for routing data packets. According to an advantageous embodiment of the present invention, the interconnection network comprises: 1) eight switching circuits capable of transferring data packets with each other; 2) eight sequential data links bidirectionally coupling the eight switching circuits in sequence to thereby form an octagonal ring configuration; and 3) four crossing data links, wherein a first crossing data link bidirectionally couples a first switching circuit to a fifth switching circuit, a second crossing data link bidirectionally couples a second switching circuit to a sixth switching circuit, a third crossing data link bidirectionally couples a third switching circuit to a seventh switching circuit, and a fourth crossing data link bidirectionally couples a fourth switching circuit to an eighth switching circuit.

According to one embodiment of the present invention, a first data packet may be transmitted from a source switching circuit to a destination switching circuit in no more than two data transfers between any of the eight switching circuits.

According to another embodiment of the present invention, the first switching circuit has switch address 0 (S0), the second switching circuit has switch address 1 (S1), the third switching circuit has switch address 2 (S2), the fourth switching circuit has switch address 3 (S3), the fifth switching circuit has switch address 4 (S4), the sixth switching circuit has switch address 5 (S5), the seventh switching circuit has switch address 6 (S6), and the eighth switching circuit has switch address 7 (S7).

According to still another embodiment of the present invention, each of the eight switching circuits is associated with a processing node capable of processing the data packets.

According to yet another embodiment of the present invention, a selected one of the eight switching circuits having switch address S(i) transfers a received data packet to a next sequential one of the eight switching circuits having switch address S(i+1) (modulo 8) if a destination switch address associated with the received data packet exceeds the switch address S(i) of the selected switching circuit by no more than 2.

According to a further embodiment of the present invention, a selected one of the eight switching circuits having switch address S(i) transfers a received data packet to a preceding sequential one of the eight switching circuits having switch address S(i−1) (modulo 8) if the switch address S(i) of the selected switching circuit exceeds a destination switch address associated with the received data packet by no more than 2.

According to a still further embodiment of the present invention, a selected one of the eight switching circuits having switch address S(i) transfers a received data packet to a selected processing node associated with the selected switching circuit if the switch address S(i) of the selected switching circuit is equal to a destination switch address associated with the received data packet.

According to a yet further embodiment of the present invention, a selected one of the eight switching circuits having switch address S(i) transfers a received data packet to an opposing one of the eight switching circuits having switch address S(i+4) (modulo 8) if a destination switch address associated with the received data packet exceeds the switch address S(i) of the selected switching circuit by more than 2.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise", as well as derivatives thereof, mean "inclusion without limitation"; the term "or", is inclusive, meaning "and/or"; the phrases "associated with" and "associated therewith", as well as derivatives thereof, may mean "include", "be included within", "interconnect with", "contain", "be contained within", "connect to or with", "couple to or with", "be communicable with", "cooperate with", "interleave", "juxtapose", "be proximate to", "be bound to or with", "have", "have a property of", or the like; and the term "controller" includes any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way so as to limit the scope of the invention. Those skilled in the art will understand that the principles of the present invention may be implemented in any suitably arranged system-on-a-chip (SOC) device.

Figure 1:
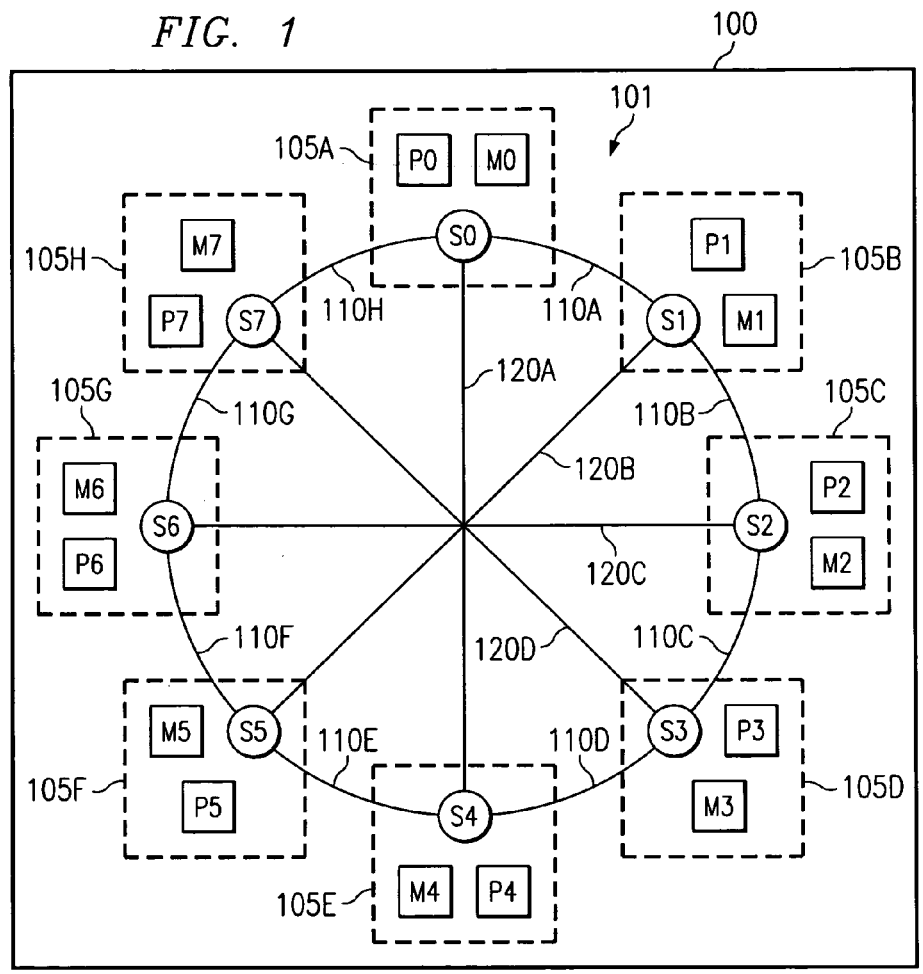
FIG. 1 illustrates an exemplary system-on-a-chip (SOC) device, which contains an octagonal interconnection network according to the principles of the present invention.

FIG. 1 illustrates exemplary system-on-a-chip (SOC) device 100, which contains an octagonal interconnection network (generally designated "101") according to the principles of the present invention. SOC device 100 comprises eight processing nodes 105A–105H. Each processing node 105 comprises a processor (Pi), a memory (Mi), and switching (or routing) circuit (Si) that forms a portion of octagonal interconnection network 101. Each processing node may comprise additional peripheral circuitry (not shown) coupled to the processor and the memory. For example, processing node 105A comprises processor P0, memory M0, and switching circuit S0.

In one important application of the present invention SOC device 100 may be a network processing unit (NPU). Generally speaking, for the purposes of this application and the claims contained herein, processing nodes 105A-105H are defined broadly to include one or more processors, one or more memories, or some hybrid combination of the same, and related peripheral circuitry such as input/output (I/O) interfaces, special purpose ASIC components, buffer, and the like. Each processing node may suitably be associated with the other processing nodes of a network of processing nodes on a SOC device.

Switching (routing) circuits S0–S7 form octagonal interconnection network 101. The designations S0, S1, S2, S3, S4, S5, S6 and S7 of the switching circuits are used to indicate relative addresses in octagonal interconnection network 101. For example, switch S0 is identified by address 0 in octagonal interconnection network 101, switch S1 is identified by address 1 in octagonal interconnection network 101, switch S2 is identified by address 2, and so forth.

According to an advantageous embodiment of the present invention, each one of switching circuits S0–S7 is bi-directionally coupled to three of the remaining ones of switching circuits S0–S7, such that data may be transferred from any one of switching circuits S0–S7 to any other one of switching circuits S0–S7 in two or less data transfers (or "hops"). This is an improvement over, for example, prior art cube topologies where three or more hops may be required between processing nodes. Switching circuits S0–S7 form an octagonal ring that is linked together serially by data links 110A–110H. Data may be transferred clockwise (or "right") around octagonal interconnection network 101 from one switching circuit S(i) to the next sequential switching circuit S(i+1)(modulo 8) on one of data links 110A–110H. Data also may be transferred counterclockwise (or "left") around octagonal interconnection network 101 from one switching circuit S(i) to the preceding sequential switching circuit S(i−1) (modulo 8) on one of data links 110A–110H. Additionally, data links 120A–120D are used to jump across octagonal interconnection network 101 from one switching circuit S(i) to an opposing switching circuit S(i+4) (modulo 8) on the opposite side of octagonal interconnection network 101.

For example, switching circuit S0 is bidirectionally coupled to switching circuit S1 by data link 110A, is bidirectionally coupled to switching circuit S7 by data link 110H, and is bidirectionally coupled to switching circuit S4 by data link 120A. Switching circuit S0 may transfer data right (clockwise) in one hop to switching circuit S1, which may in turn transfer data right (clockwise) to switching circuit S2. Thus, switching circuit S0 can transfer data to switching circuits S1 and S2 in two data transfers (hops) or less.

Similarly, switching circuit S0 may transfer data left (counterclockwise) in one hop to switching circuit S7, which may in turn transfer data left (counterclockwise) to switching circuit S6. Thus, switching circuit S0 can transfer data to switching circuits S6 and S7 in two data transfers (hops) or less.

Finally, switching circuit S0 may transfer data across in one hop to switching circuit S4. Switching circuit S4 may in turn transfer data left (counterclockwise) to switching circuit S3 or may in turn transfer data right (clockwise) to switching circuit S5. Thus, switching circuit S0 can transfer data to switching circuits S3, S4, and S5 in two data transfers (hops) or less.

Switching circuits S0–S7 are coupled to octagonal interconnection network 101 is the same manner as switching circuit S0. Thus, each one of switching circuits S0–S7 may transfer data to any other one of switching circuits S0–S7 in two or less data transfers (hops).

Figure 2:
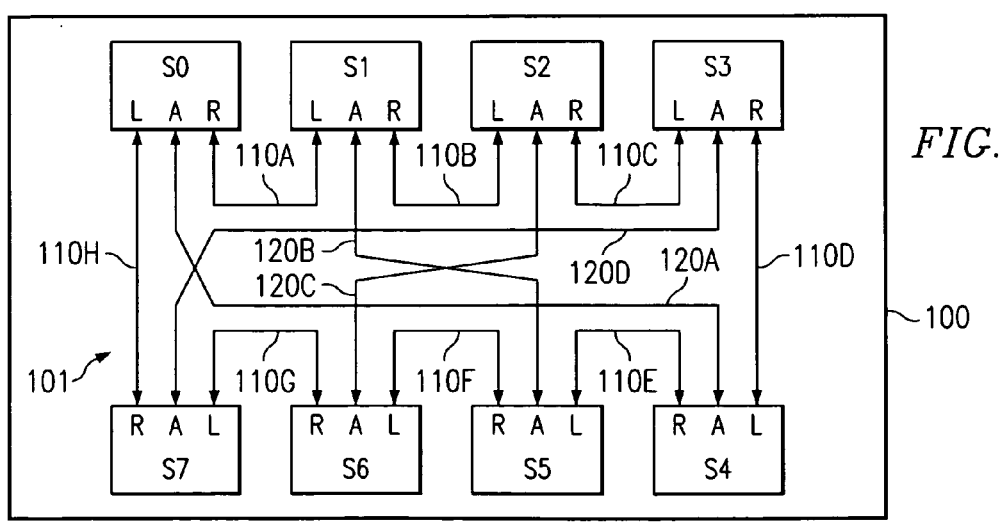
FIG. 2 is a first network topology view of selected portions of the octagonal interconnection network in the exemplary SOC device according to an exemplary embodiment of the present invention.

FIG. 2 is a network topology view of selected portions of octagonal interconnection network 101 in exemplary SOC device 100 according to an exemplary embodiment of the present invention. The interconnections of switching circuits S0–S7 are shown in FIG. 2. Each connection port of switching circuits S0–S7 is labeled with an "L", an "A", or an "R" to indicate whether the connection port transmits data left (L), right (R) or across (A) with respect to octagonal interconnection network 101.

For example, connection port L of switching circuit S0 transmits data left (counterclockwise) to connection port R of switching circuit S7, connection port R of switching circuit S0 transmits data right (clockwise) to connection port L of switching circuit S1, and connection port A of switching circuit S0 transmits data across to connection port A of switching circuit S4. Similarly, connection port L of switching circuit S7 transmits data left (counterclockwise) to connection port R of switching circuit S6, connection port R of switching circuit S7 transmits data right (clockwise) to connection port L of switching is circuit SO, and connection port A of switching circuit S7 transmits data across to connection port A of switching circuit S3.

Figure 3:
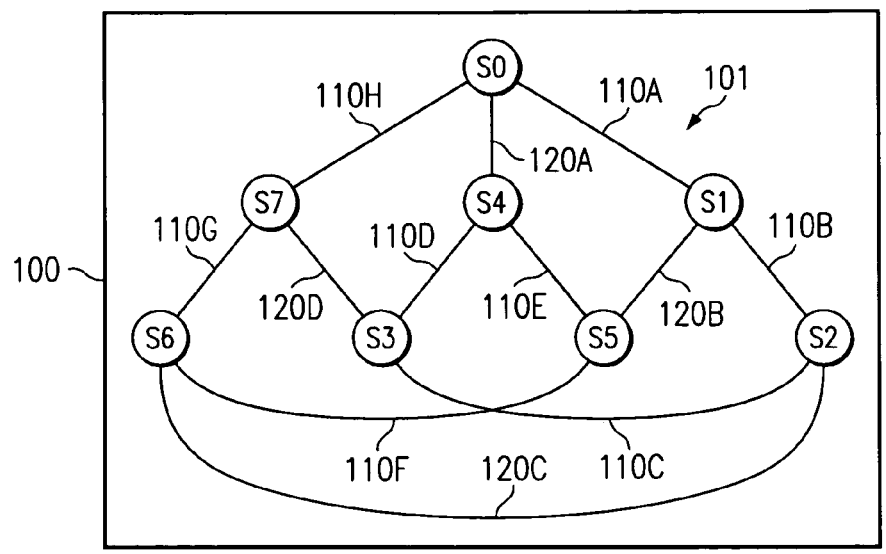
FIG. 3 is a second network topology view of selected portions of the octagonal interconnection network in the exemplary SOC device according to the exemplary embodiment of the present invention.

FIG. 3 is an alternative network topology view of selected portions of octagonal interconnection network 101 in exemplary SOC device 100 according to the exemplary embodiment of the present invention. FIG. 3 clearly illustrates that it is possible to move from any one of switching circuits S0–S7 to any other one of switching circuits S0–S7 in two or less hops.

Figure 4:
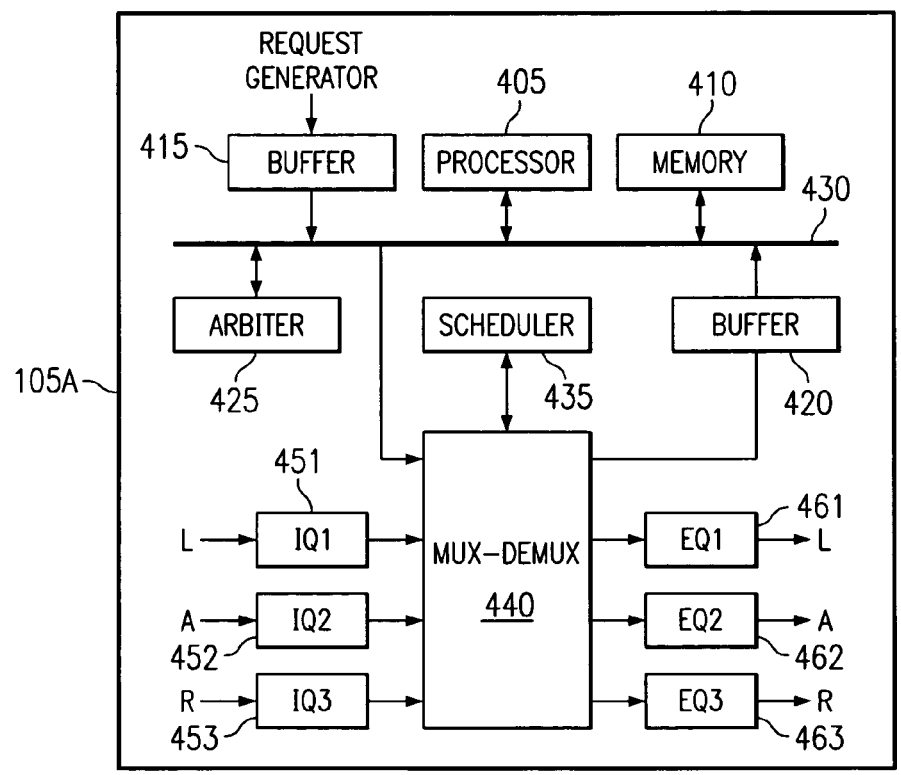
FIG. 4 illustrates an exemplary processing node associated with the octagonal interconnection network according to the exemplary embodiment of the present invention.

FIG. 4 illustrates in greater detail exemplary processing node 105A associated with octagonal interconnection network 101 according to one embodiment of the present invention. Since processing nodes 105B–105H are substantially identical to processing node 105A, the discussion of processing node 105A that follows is also applicable to each one or processing nodes 105B–105H. Therefore, a separated description of processing nodes 105B–105H is not required.

Exemplary processing node 105 comprises processor 405 (e.g., P0, P1, etc.), memory 410 (e.g., M0, M1, etc.), buffer 415, buffer 420, and arbiter 425, which are coupled together by bus 430. Exemplary processing node 105 also comprises scheduler 435, multiplexer-demultiplexer (MUX-DEMUX) network 440, ingress (or input) queues 451–453, and egress (or output) queues 461–463. Ingress queues (IQ) 451, 452 and 453 are arbitrarily labeled IQ1, IQ2, and IQ3, respectively. Egress queues (EQ) 451, 452 and 453 are arbitrarily labeled EQ1, EQ2, and EQ3, respectively.

Switching circuit S0 in FIG. 1 is represented by arbiter 425, scheduler 435, MUX-DEMUX network 440, ingress queues 451–453, and egress queues 461–463 in processing node 105A. Arbiter 425 controls the processing of data packets residing in ingress queues 451–453, including performing such functions as packet prioritization. Scheduler 435 controls the transmission of data packets to egress queues 461–463 and from ingress queues 451–453.

Each of ingress queues 451–453 may store up to N inbound data packets from the orthogonal interconnection network, wherein the value of N may be different or the same for two or more of ingress queues 451–453. Ingress queue 451 receives packets from switching circuit S7 via bi-directional connection port L. Ingress queue 452 receives packets from switching circuit S4 via bi-directional connection port A. Ingress queue 453 receives packets from switching circuit S2 via bi-directional connection port R. Data packets that are destined for processing node 105A (i.e., that are addressed to switching circuit S0) are received by one of ingress queues 451–453 and are transferred via MUX-DEMUX 440 to buffer 420 before being sent to, for example, memory 410 or processor 405.

Each of egress queues 461–463 may store up to M outbound data packets destined for the orthogonal interconnection network, wherein the value of M may be different or the same for two or more of egress queues 461–463. Egress queue 461 transmits packets to switching circuit S7 via bi-directional connection port L. Egress queue 462 transmits packets to switching circuit S4 via bi-directional connection port A. Egress queue 463 transmits packets to switching circuit S2 via bi-directional connection port R. Data packets originating in processing node 105A or received from an external request generator source by buffer 415 that are to be transmitted into the orthogonal interconnection network (i.e., that are addressed to switching circuits S1–S7) are transferred via MUX-DEMUX 440 from bus 430 to one of egress queues 461–463.

Octagonal interconnection network 101 may be implemented as a connectionless network or as a connection-oriented network. An exemplary connectionless octagonal interconnection network 101 is one in which each processing node includes at least one ingress queue and three egress queues. According to such an embodiment, incoming (or inbound) messages from all three links are suitably buffered at the at least one ingress queue and processed according to an appropriate discipline, such as first-come-first-served. Thus, a message that is destined for other nodes is processed and forwarded to the appropriate output link. Otherwise, it is consumed (i.e., used by the node). A differentiating factor is the order in which the ingress queue serves incoming messages. System throughput and quality of service (QoS) are highly dependent upon the particular service discipline.

An exemplary connection-oriented octagonal interconnection network 101 is one in which a central controller maintains a list of connection requests and operates to schedule such connections according to appropriate algorithms. To enhance efficiency, connections that do not overlap may be allowed concurrently.

Figure 5:
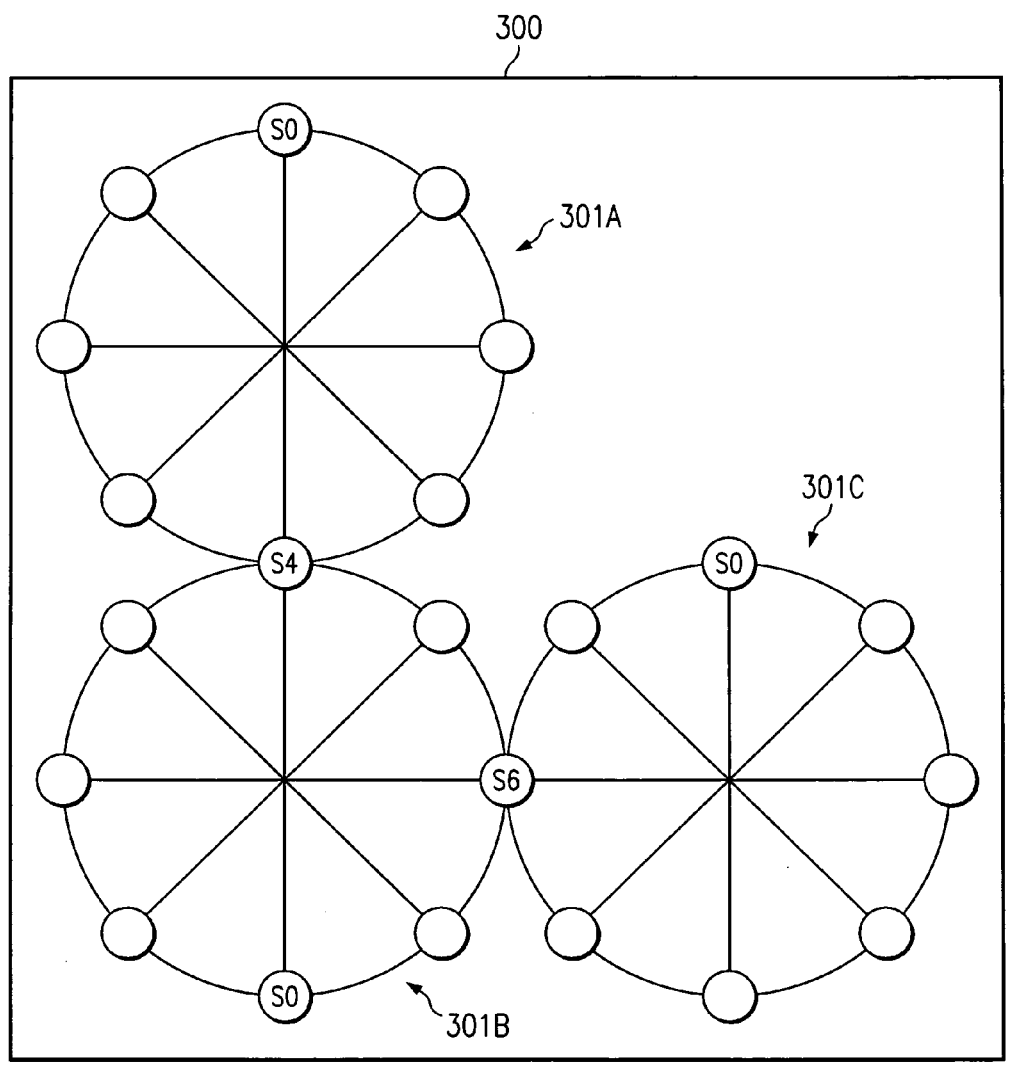
FIG. 5 is a network topology view of a plurality of octagonal interconnection networks coupled together in an exemplary SOC device according to the exemplary embodiment of the present invention.

FIG. 5 is a network topology view of a plurality of octagonal interconnection networks 301A–301C coupled together in exemplary SOC device 300 according to the exemplary embodiment of the present invention. Octagonal interconnection networks 301A–301C include a total of twenty-two processing nodes 105 coupled by thirty-six communication links. Octagonal interconnection networks 301A–301C have several advantageous aspects including:

1) Each exemplary processing node 105 in each one of octagonal interconnection networks 301A–301C is at most two hops (link transfers) from any other processing node 105 within the same one of octagonal interconnection networks 301A–301C and is at most six hops from any other processing node 105 in a different one of octagonal interconnection networks 301A–301C; and 2) Switching circuit S4 of processing node 105E in octagonal interconnection network 301A operates to respectively link octagonal interconnection networks 301A and 301B. Switching circuit S6 of processing node 105G in octagonal interconnection network 301B operates to respectively link octagonal interconnection networks 301B and 301C.

Figure 6:
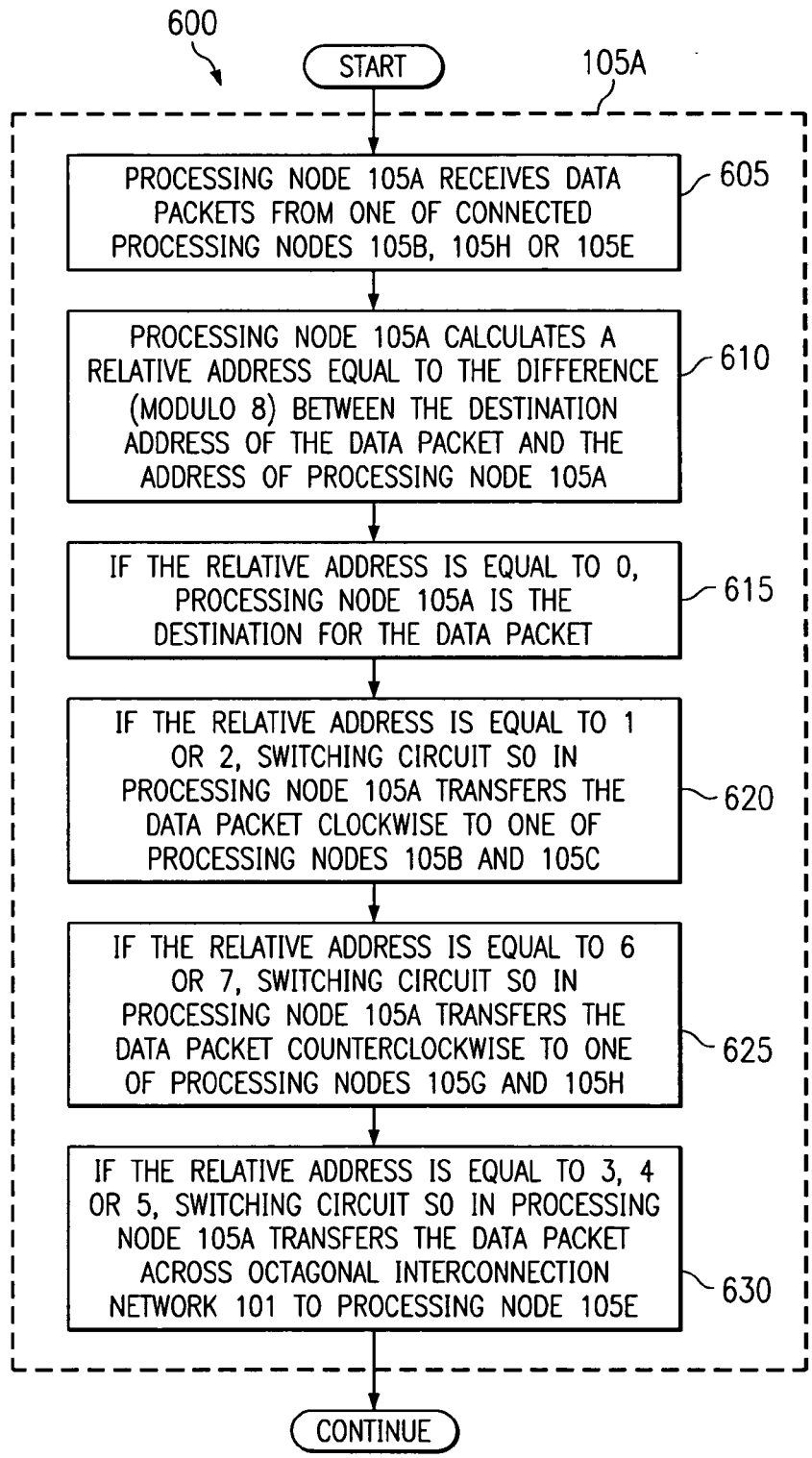
FIG. 6 is flow diagram illustrating the operation of the exemplary octagonal interconnection network according to an exemplary embodiment of the present invention.

FIG. 6 is flow diagram illustrating the operation of the exemplary processing node 105A in octagonal interconnection network 101 according to an exemplary embodiment of the present invention. Processing node 105A receives data packets from one of connected processing nodes 105B, 105H or 105E (process step 605). Processing node 105A calculates a relative address (REL_ADDR) equal to the difference (modulo 8) between the destination address (DEST_ADDR) of the data packet and the node address (NODE_ADDR) of processing node 105A (process step 610). In other words, $$REL\_ADDR = DEST\_ADDR - NODE\_ADDR \text{ (modulo 8)}.$$

If the relative address is equal to 0, processing node 105A is the destination for the data packet (process step 615). The data packet is then processed by processor 405 or stored in memory 410, and the like. If the relative address is equal to 1 or 2, switching circuit S0 in processing node 105A transfers the data packet clockwise to one of processing nodes 105B and 105C (process step 620). If the relative address is equal to 6 or 7, switching circuit S0 in processing node 105A transfers the data packet counterclockwise to one of processing nodes 105G and 105H (process step 625). If the relative address is equal to 3, 4 or 5, switching circuit S0 in processing node 105A transfers the data packet across octagonal interconnection network 101 to processing node 105E (process step 630).

For example, if processing nodes 105G, which has a node address of 6 (i.e., S6), receives a data packet with a destination address of 0 (i.e., S0 in processing node 105A), then the relative address is determined to be: (0−6)=(−6)=2 (modulo 8). So, the data packet is transferred clockwise to switching circuit S7 in processing node 105H. The process is then repeated in processing node 105H, where the relative address is determined to be: (0−7)=(−7)=1 (modulo 8). So, the data packet is transferred clockwise to switching circuit S0 in processing node 105A, which is the final destination address. In switching circuit S0, the relative address is determined to be: (0−0)=0 (modulo 8). So, the data packet is processed (consumed) in processing node 105A.

Although the present invention has been described in detail, those skilled in the art should understand that they can make various changes, substitutions and alterations herein without departing from the spirit and scope of the invention in its broadest form.

What is claimed is:

1. An interconnection network for routing data packets comprising:
    eight switching circuits capable of transferring data packets with each other;
    eight sequential data links bidirectionally coupling said eight switching circuits in sequence to thereby form an octagonal ring configuration; and
    only four crossing data links, wherein a first crossing data link bidirectionally couples a first switching circuit to a fifth switching circuit, a second crossing data link bidirectionally couples a second switching circuit to a sixth switching circuit, a third crossing data link bidirectionally couples a third switching circuit to a seventh switching circuit, and a fourth crossing data link bidirectionally couples a fourth switching circuit to an eighth switching circuit,
    wherein said first switching circuit has switch address 0 (S0), said second switching circuit has switch address 1 (S1), said third switching circuit has switch address 2 (S2), said fourth switching circuit has switch address 3 (S3), said fifth switching circuit has switch address 4 (S4), said sixth switching circuit has switch address 5 (S5), said seventh switching circuit has switch address 6 (S6), and said eighth switching circuit has switch address 7 (S7),
    wherein each of said eight switching circuits is associated with a processing node capable of processing said data packets,
    wherein a selected one of said eight switching circuits having switch address S(i) transfers a received data packet to a next sequential one of said eight switching circuits having switch address S(i+1) (modulo 8) if a destination switch address associated with said received data packet exceeds said switch address S(i) of said selected switching circuit by no more than 2.

2. The interconnection network as set forth in claim 1 wherein a first data packet may be transmitted from a source switching circuit to a destination switching circuit in no more than two data transfers between any of said eight switching circuits.

3. The interconnection network as set forth in claim 1 wherein a selected one of said eight switching circuits having switch address S(i) transfers a received data packet to a selected processing node associated with said selected switching circuit if said switch address S(i) of said selected switching circuit is equal to a destination switch address associated with said received data packet.

4. An interconnection network for routing data packets comprising:
    eight switching circuits capable of transferring data packets with each other;
    eight sequential data links bidirectionally coupling said eight switching circuits in sequence to thereby form an octagonal ring configuration; and
    only four crossing data links, wherein a first crossing data link bidirectionally couples a first switching circuit to a fifth switching circuit, a second crossing data link bidirectionally couples a second switching circuit to a sixth switching circuit, a third crossing data link bidirectionally couples a third switching circuit to a seventh switching circuit, and a fourth crossing data link bidirectionally couples a fourth switching circuit to an eighth switching circuit,
    wherein said first switching circuit has switch address 0 (S0), said second switching circuit has switch address 1 (S1), said third switching circuit has switch address 2 (S2), said fourth switching circuit has switch address 3 (S3), said fifth switching circuit has switch address 4 (S4), said sixth switching circuit has switch address 5 (S5), said seventh switching circuit has switch address 6 (S6), and said eighth switching circuit has switch address 7 (S7),
    wherein each of said eight switching circuits is associated with a processing node capable of processing said data packets,
    wherein a selected one of said eight switching circuits having switch address S(i) transfers a received data packet to a preceding sequential one of said eight switching circuits having switch address S(i−1) (modulo 8) if said switch address S(i) of said selected switching circuit exceeds a destination switch address associated with said received data packet by no more than 2.

5. An interconnection network for routing data packets comprising:
    eight switching circuits capable of transferring data packets with each other;
    eight sequential data links bidirectionally coupling said eight switching circuits in sequence to thereby form an octagonal ring configuration; and
    only four crossing data links, wherein a first crossing data link bidirectionally couples a first switching circuit to a fifth switching circuit, a second crossing data link bidirectionally couples a second switching circuit to a sixth switching circuit, a third crossing data link bidirectionally couples a third switching circuit to a seventh switching circuit, and a fourth crossing data link bidirectionally couples a fourth switching circuit to an eighth switching circuit, wherein said first switching circuit has switch address 0 (S0), said second switching circuit has switch address 1 (S1), said third switching circuit has switch address 2 (S2), said fourth switching circuit has switch address 3 (S3), said fifth switching circuit has switch address 4 (S4), said sixth switching circuit has switch address 5 (S5), said seventh switching circuit has switch address 6 (S6), and said eighth switching circuit has switch address 7 (S7), wherein each of said eight switching circuits is associated with a processing node capable of processing said data packets, wherein a selected one of said eight switching circuits having switch address S(i) transfers a received data packet to an opposing one of said eight switching circuits having switch address S(i+4) (modulo 8) if a destination switch address associated with said received data packet exceeds said switch address S(i) of said selected switching circuit by more than 2.

6. A system-on-a-chip (SOC) device comprising:

eight processing nodes, wherein each of said eight processing node is capable of processing data packets; and an interconnection network for transferring data packets between said eight processing nodes, said interconnection network comprising:

eight switching circuits capable of transferring data packets with each other, wherein each of said eight switching circuits is associated with one of said eight processing nodes;

eight sequential data links bidirectionally coupling said eight switching circuits in sequence to thereby form an octagonal ring configuration; and only four crossing data links, wherein a first crossing data link bidirectionally couples a first switching circuit to a fifth switching circuit, a second crossing data link bidirectionally couples a second switching circuit to a sixth switching circuit, a third crossing data link bidirectionally couples a third switching circuit to a seventh switching circuit, and a fourth crossing data link bidirectionally couples a fourth switching circuit to an eighth switching circuit, wherein said first switching circuit has switch address 0 (S0), said second switching circuit has switch address 1 (S1), said third switching circuit has switch address 2 (S2), said fourth switching circuit has switch address 3 (S3), said fifth switching circuit has switch address 4 (S4), said sixth switching circuit has switch address 5 (S5), said seventh switching circuit has switch address 6 (S6), and said eighth switching circuit has switch address 7 (S7), and wherein a selected one of said eight switching circuits having switch addess S(i) transfers a received data packet to a next sequential one of said eight switching circuits having switch address S(i+1) (modulo 8) if a destination switch address associated with said received data packet exceeds said switch address S(i) of said selected switching circuit by no more than 2.

7. The system-on-a-chip (SOC) device as set forth in claim 6 wherein a first data packet may be transmitted from a source switching circuit to a destination switching circuit in no more than two data transfers between any of said eight switching circuits.

8. The system-on-a-chip (SOC) device as set forth in claim 6 wherein a selected one of said eight switching circuits having switch address S(i) transfers a received data packet to a selected processing node associated with said selected switching circuit if said switch address S(i) of said selected switching circuit is equal to a destination switch address associated with said received data packet.

9. A system-on-a-chip (SOC) device comprising:

eight processing nodes, wherein each of said eight processing node is capable of processing data packets; and an interconnection network for transferring data packets between said eight processing nodes, said interconnection network comprising:

eight switching circuits capable of transferring data packets with each other, wherein each of said eight switching circuits is associated with one of said eight processing nodes;

eight sequential data links bidirectionally coupling said eight switching circuits in sequence to thereby form an octagonal ring configuration; and only four crossing data links, wherein a first crossing data link bidirectionally couples a first switching circuit to a fifth switching circuit, a second crossing data link bidirectionally couples a second switching circuit to a sixth switching circuit, a third crossing data link bidirectionally couples a third switching circuit to a seventh switching circuit, and a fourth crossing data link bidirectionally couples a fourth switching circuit to an eighth switching circuit, wherein said first switching circuit has switch address 0 (S0), said second switching circuit has switch address 1 (S1), said third switching circuit has switch address 2 (S2), said fourth switching circuit has switch address 3 (S3), said fifth switching circuit has switch address 4 (S4), said sixth switching circuit has switch address 5 (S5), said seventh switching circuit has switch address 6 (S6), and said eighth switching circuit has switch address 7 (S7), and wherein a selected one of said eight switching circuits having switch address S(i) transfers a received data packet to a preceding sequential one of said eight switching circuits having switch address S(i−1) (modulo 8) if said switch address S(i) of said selected switching circuit exceeds a destination switch address associated with said received data packet by no more than 2.

10. A system-on-a-chip (SOC) device comprising:

eight processing nodes, wherein each of said eight processing node is capable of processing data packets; and an interconnection network for transferring data packets between said eight processing nodes, said interconnection network comprising:

eight switching circuits capable of transferring data packets with each other, wherein each of said eight switching circuits is associated with one of said eight processing nodes;

eight sequential data links bidirectionally coupling said eight switching circuits in sequence to thereby form an octagonal ring configuration; and only four crossing data links, wherein a first crossing data link bidirectionally couples a first switching circuit to a fifth switching circuit, a second crossing data link bidirectionally couples a second switching circuit to a sixth switching circuit, a third crossing data link bidirectionally couples a third switching circuit to a seventh switching circuit, and a fourth crossing data link bidirectionally couples a fourth switching circuit to an eighth switching circuit, wherein said first switching circuit has switch address 0 (S0), said second switching circuit has switch address 1 (S1), said third switching circuit has switch address 2 (S2), said fourth switching circuit has switch address 3 (S3), said fifth switching circuit has switch address 4 (S4), said sixth switching circuit has switch address 5 (S5), said seventh switching circuit has switch address 6 (S6), and said eighth switching circuit has switch address 7 (S7), and wherein a selected one of said eight switching circuits having switch address S(i) transfers a received data packet to an opposing one of said eight switching circuits having switch address S(i+4) (modulo 8) if a destination switch address associated with said received data packet exceeds said switch address S(i) of said selected switching circuit by more than 2.

11. A method of transferring data in an interconnection network comprising: 1) eight switching circuits capable of transferring data packets with each other; 2) eight sequential data links bidirectionally coupling the eight switching circuits in sequence to thereby form an octagonal ring configuration; and 3) four crossing data links, wherein a first crossing data link bidirectionally couples a first switching circuit to a fifth switching circuit, a second crossing data link bidirectionally couples a second switching circuit to a sixth switching circuit, a third crossing data link bidirectionally couples a third switching circuit to a seventh switching circuit, and a fourth crossing data link bidirectionally couples a fourth switching circuit to an eighth switching circuit, the method comprising the steps of:

receiving a data packet in a selected one of the eight switching circuits having switch address S(i); and transferring the received data packet to a next sequential one of the eight switching circuits having switch address S(i+1) (modulo 8) if a destination switch address associated with the received data packet exceeds the switch address S(i) of the selected switching circuit by no more than 2.

12. The method of transferring data as set forth in claim 11 wherein the selected switching circuit having switch address S(i) transfers the received data packet to a next sequential one of the eight switching circuits having switch address S(i+1) (modulo 8) if the destination switch address exceeds the switch address S(i) of the selected switching circuit by no more than 2.

13. The method of transferring data as set forth in claim 12 wherein the selected switching circuit having switch address S(i) transfers the received data packet to a preceding sequential one of the eight switching circuits having switch address S(i−1) (modulo 8) if the switch address S(i) of the selected switching circuit exceeds the destination switch address by no more than 2.

14. The method of transferring data as set forth in claim 13 wherein the selected switching circuit transfers the received data packet to a selected processing node associated with the selected switching circuit if the switch address S(i) of the selected switching circuit is equal to the destination switch address.

15. The method of transferring data as set forth in claim 14 wherein the selected switching circuit transfers the received data packet to an opposing one of the eight switching circuits having switch address S(i+4) (modulo 8) if the destination switch address exceeds the switch address S(i) of the selected switching circuit by more than 2.

* * * * *